R. E. WHITE.
STEAM COOKER.
APPLICATION FILED NOV. 18, 1910.

1,007,999.

Patented Nov. 7, 1911.

Witnesses

Ray E. White, Inventor by C. A. Snow & Co.
Attorneys

UNITED STATES PATENT OFFICE.

RAY E. WHITE, OF CHARLOTTE, MICHIGAN.

STEAM-COOKER.

1,007,999. Specification of Letters Patent. Patented Nov. 7, 1911.

Application filed November 18, 1910. Serial No. 593,104.

*To all whom it may concern:*

Be it known that I, RAY E. WHITE, a citizen of the United States, residing at Charlotte, in the county of Eaton and State of Michigan, have invented a new and useful Steam-Cooker, of which the following is a specification.

It is one object of this invention to provide a cooker which will supply steam rapidly to the cooking chamber.

Another object of the invention is to provide novel means for regulating and controlling the flow of water to the chamber in which the steam is generated.

A further object of the invention is to provide a cooker, the body of which is adapted for the ready and convenient reception of the food to be cooked, and likewise adapted for the rapid generation of steam and the delivery of the steam to that portion of the body in which the food is immediately contained.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
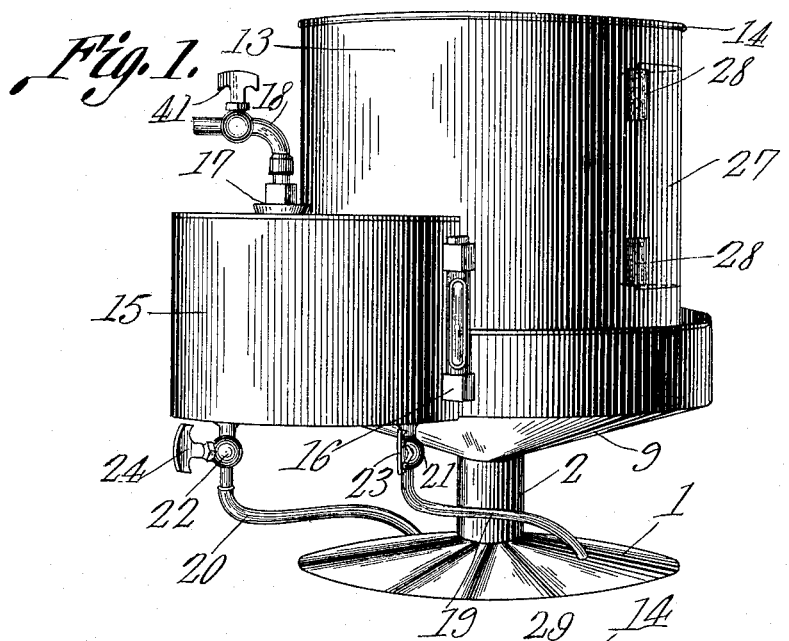
Figure 2:
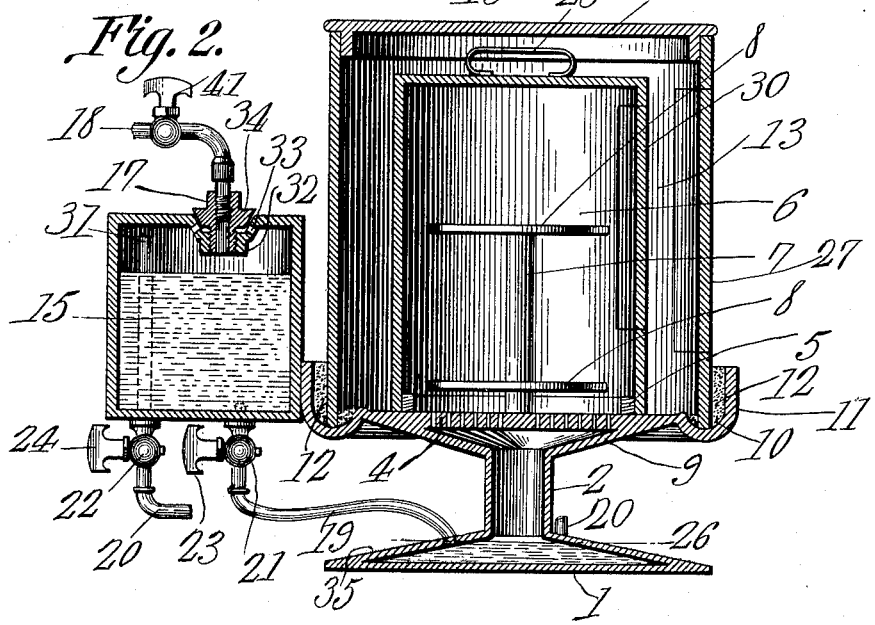

In the drawings,—Figure 1 is a perspective; and Fig. 2 is a vertical longitudinal section, wherein sundry details appear in elevation.

In carrying out the invention, a hollow base 1 is provided, the top of which slopes downwardly toward the periphery of the base, as shown at 35. Fixed to the portion 35 of the base 1, and rising above the same, is a tubular neck 2, terminating at its upper end in a funnel 9, provided with a perforated top 4. The funnel 9 is provided with a peripheral trough 10, terminating in an upstanding flange 11, rising above the plane of the perforated top 4.

There is an upstanding annular rib 5 upon the top 4, this rib 5 being adapted to retain in place, the inner receptacle 6 which incloses the rib 5. If desired, the inner receptacle 6 may carry a handle 29 at its top, whereby the receptacle 6 may be manipulated. Fixed to and rising from the perforated top 4, is a pedestal 7, carrying spaced shelves 8, upon which the food which is to be cooked or heated, is placed when the device is in operation.

The invention further includes an outer receptacle 13, inclosing, but spaced from, the inner receptacle 6. The lower end of the outer receptacle 13 rests in the trough 10, and is embedded in a packing 12, ordinarily of asbestos, this packing being retained between the flange 11 and the wall of the outer receptacle 13. The outer receptacle 13 is closed at its upper end by a lid 14. If desired, the outer receptacle 13 may be equipped with a door 27, hinged at 28, the inner receptacle 6 being similarly equipped, as shown at 30.

The invention further includes a tank 15, preferably although not necessarily, supported by the flange 11. The height of the water which is in the tank 15 may be indicated by the gage glass 16. The top of the tank 15 is provided with an inwardly extended neck 32, having a conical seat, adapted to receive the conical head 34 of a plug 17, the lower end of the plug being threaded into the neck 32, as clearly seen in Fig. 2. In the neck 32 there are vents 33, and when the head 34 of the plug 17 is firmly seated in the neck 32, these vents 33 will be closed, the plug 17, however, being rotatable, to open the vents 33, as Fig. 2 will clearly show. The water supply pipe 18, threaded into the plug 17, or otherwise secured thereto, has a cut-off cock 41.

A pipe 19 forms a communication between the hollow base 1 and the interior of the tank 15, the pipe 19 terminating adjacent the bottom of the tank. In the pipe 19, there is a valve 21, controlled by a finger piece 23 or the like. Another pipe 20 forms a communication between the hollow base 1 and the tank 15. This pipe 20 enters the base 1 at a point slightly above the inlet end of the pipe 19. Moreover, as clearly seen in Fig. 2, and there denoted by the numeral 31, the end of the pipe 20 is carried upwardly through the bottom of the tank 15, to a point adjacent the top of the tank. The pipe 20 is equipped with the valve mechanism 22, 24, hereinbefore mentioned in connection with the pipe 19.

In practical operation, the material which is to be heated or cooked, is placed upon the shelves 8, the material being introduced within the inner receptacle 6, either through the doors 27 and 30, or by removing the lid 14 and lifting the inner receptacle 6 out of the outer receptacle 13. The finger pieces 23 and 24 are manipulated so as to close the pipes 19 and 20, and the plug 17 is rotated slightly, so as to uncover the vents 33. The water may then be permitted to enter the tank 15 through the pipe 18, the air passing outwardly through the vents 33, the tank 15 being filled partially, to a point slightly below the upper end of the portion 31 of the pipe 20, whereupon the cut-off cock 41 is closed, hermetically sealing the upper part of the tank. The plug 17 is then rotated, so as to close the vents 33, thereby sealing the tank 15. If the finger pieces 23 and 24 be now manipulated, to open the pipes 19 and 20, respectively, the water will flow through the pipe 19 and fill the hollow base 1 to a point approximating the line 26; that is, until the ends of the pipes 19 and 20 are covered. At this level, the water in the hollow base 1 will remain, until, through evaporation, the level of the water in the hollow base 1 is lowered below the end of the pipe 20. In such case, air will pass into the tank 15 through the pipe 20, permitting more water to flow through the pipe 19 into the hollow base 1, until the ends of the pipes 19 and 20 are covered. The hollow base 1 is placed over a source of heat, and the water which is within the base will be converted rapidly into steam, the steam rising through the tubular neck 2, and through the perforated top 4 of the funnel, into the interior of the inner receptacle 6, thereby cooking or warming food which is upon the shelves 8.

It will be seen that but a small quantity of water at a time is admitted into the base 1, the water in the base 1 being, therefore, rapidly converted into steam. The inclined portion 35 of the base serves to direct the steam upwardly into the neck 2, and thence into the interior of the inner receptacle 6.

The hollow, frusto-conical base 1 constitutes the boiler proper, in which the water is evaporated, and the space within the inner receptacle 6 constitutes a steam chamber about the boiler. The perforated top 4 of the funnel acts as a distributing plate for properly dispersing the steam within the inner receptacle 6.

Having thus described the invention, what is claimed is:—

A device of the class described comprising a boiler and a steam chamber above the boiler; a liquid supply tank; pipes entering the boiler at different heights, the upper pipe opening into the tank adjacent the top of the tank, and the lower pipe opening into the tank adjacent the bottom of the tank; means for admitting liquid in predetermined quantities into the tank; and means for controlling the flow of the liquid through the pipes.

In testimony that I claim the foregoing as my own, I have hereto affixed my signature in the presence of two witnesses.

RAY E. WHITE.

Witnesses:
 BERTHA A. NICHOLS,
 MARY E. WORDEN.